(12) United States Patent
Shim et al.

(10) Patent No.: US 9,402,001 B2
(45) Date of Patent: Jul. 26, 2016

(54) SEPARATE BILLING SYSTEM FOR BYOD SERVICE AND SEPARATE BILLING METHOD FOR DATA SERVICE

(71) Applicant: nTels Co., Ltd., Seoul (KR)

(72) Inventors: Jae Hee Shim, Seoul (KR); Chong Wook Kwon, Seoul (KR); Seong Ju Kim, Seoul (KR); Yae Ho Kim, Seoul (KR)

(73) Assignee: NTELS CO., LTD., Seoul (KR)

( * ) Notice: Subject to any disclaimer, the term of this patent is extended or adjusted under 35 U.S.C. 154(b) by 229 days.

(21) Appl. No.: 14/277,165

(22) Filed: May 14, 2014

(65) Prior Publication Data

US 2014/0341083 A1 Nov. 20, 2014

(30) Foreign Application Priority Data

May 15, 2013 (KR) .................. 10-2013-0055235
Jun. 19, 2013 (KR) .................. 10-2013-0070175

(51) Int. Cl.
*H04L 29/06* (2006.01)
*H04L 12/701* (2013.01)
*H04M 15/00* (2006.01)

(52) U.S. Cl.
CPC .............. *H04M 15/68* (2013.01); *H04M 15/43* (2013.01); *H04M 15/44* (2013.01); *H04M 15/52* (2013.01)

(58) Field of Classification Search
USPC ................ 370/259; 455/408, 432.1; 726/4
See application file for complete search history.

(56) References Cited

U.S. PATENT DOCUMENTS

| | | | |
|---|---|---|---|
| 6,018,657 A * | 1/2000 | Kennedy et al. | 455/426.1 |
| 8,613,069 B1 * | 12/2013 | Martini | 726/8 |
| 2002/0103808 A1 * | 8/2002 | Owen, Jr. | 707/102 |
| 2002/0161601 A1 * | 10/2002 | Nauer et al. | 705/1 |
| 2003/0091016 A1 * | 5/2003 | Ko et al. | 370/338 |
| 2003/0110044 A1 * | 6/2003 | Nix et al. | 705/1 |
| 2005/0182948 A1 * | 8/2005 | Ducharme | 713/189 |
| 2007/0180101 A1 * | 8/2007 | Chen et al. | 709/224 |
| 2008/0004061 A1 * | 1/2008 | Takeda | 455/518 |
| 2008/0261562 A1 * | 10/2008 | Jwa et al. | 455/411 |
| 2009/0125631 A1 * | 5/2009 | Blom et al. | 709/228 |
| 2010/0325518 A1 * | 12/2010 | Kim et al. | 714/755 |
| 2010/0325691 A1 * | 12/2010 | Willars et al. | 726/1 |
| 2013/0006673 A1 * | 1/2013 | Hurston et al. | 705/4 |
| 2013/0046665 A1 * | 2/2013 | Zabawskyj et al. | 705/34 |
| 2013/0267198 A1 * | 10/2013 | DeBenedictis et al. | 455/408 |
| 2013/0283296 A1 * | 10/2013 | Brown | 719/318 |
| 2013/0297700 A1 * | 11/2013 | Hayton et al. | 709/204 |
| 2013/0316703 A1 * | 11/2013 | Girard et al. | 455/432.1 |

(Continued)

FOREIGN PATENT DOCUMENTS

KR  10-2008-0015170 A  2/2008

*Primary Examiner* — Edan Orgad
*Assistant Examiner* — Sithu Ko
(74) *Attorney, Agent, or Firm* — Paratus Law Group, PLLC

(57) ABSTRACT

A separate billing system for BYOD service includes a business service server configured to provide a business service, a terminal configured to request a business service from the business service server, a billing policy server configured to store billing policy information, a BYOD service gateway configured to control the terminal to transmit and receive data with the business service server via an access device, and generate billing data according to the transmission and reception, and a separate billing server configured to analyze the billing data based on the billing policy information, and generate separate billing information.

20 Claims, 9 Drawing Sheets

(56) References Cited

U.S. PATENT DOCUMENTS

2014/0095894 A1* 4/2014 Barton et al. ............... 713/190
2014/0173692 A1* 6/2014 Srinivasan et al. ............ 726/4
2014/0199962 A1* 7/2014 Mohammed et al. ......... 455/406
2014/0228071 A1* 8/2014 Villarrubia Grande et al. ............ 455/552.1
2014/0279454 A1* 9/2014 Raman et al. ................ 705/40

* cited by examiner

FIG. 4

| SERVICE DOMAIN (URL OR IP) | PORT | TYPE OF SERVICE | BUSINESS INFORMATION | SUBJECT TO BE CHARGED | BILLING CRITERION VARIABLE | SUBJECT TO BE SERVICED | QGS RANKING | BILLING RATE RANKING |
|---|---|---|---|---|---|---|---|---|
| gw.ss.com | 8000 | GROUPWARE | COMPANY SS | CHARGED TO COMPANY | AMOUNT OF USAGE | REGISTERED EMPLOYEE | 1 | 1 |
| mail.ss.com | 80 | MAIL | COMPANY SS | CHARGED TO COMPANY | AMOUNT OF USAGE | REGISTERED EMPLOYEE | 1 | 2 |
| potal.ss.com | 80 | PORTAL | COMPANY SS | CHARGED TO COMPANY | BANDWIDTH | REGISTERED EMPLOYEE | 1 | 3 |
| 10.10.1.20 | 6000 | APPLICATION | COMPANY SS | CHARGED TO COMPANY | AMOUNT OF USAGE | REGISTERED EMPLOYEE | 1 | 1 |
| movie.com | 80 | ADVERTISEMENT | FILM MAKER | CHARGED TO SPONSOR | BANDWIDTH | ALL USERS | 3 | 3 |
| bank.com | 8888 | FINANCE | BANK | CHARGED TO SPONSOR | AMOUNT OF USAGE | ALL USERS | 1 | 1 |
| gw.yy.com | 7000 | GROUPWARE | COMPANY YY | CHARGED TO COMPANY | AMOUNT OF USAGE | REGISTERED EMPLOYEE | 2 | 1 |
| mail.yy.com | 80 | MAIL | COMPANY YY | CHARGED TO COMPANY | AMOUNT OF USAGE | REGISTERED EMPLOYEE | 2 | 2 |
| potal.yy.com | 80 | PORTAL | COMPANY YY | CHARGED TO COMPANY | BANDWIDTH | REGISTERED EMPLOYEE | 2 | 3 |
| UNREGISTERED DOMAIN | * | N/A | N/A | CHARGED TO USER | AMOUNT OF USAGE | ALL USERS | 9 | 9 |

FIG. 5

| COMPANY ID | DEPARTMENT ID | USER ID | USER IP | USER PORT | PROTOCOL | APPLICATION ID | CONTENT ID | LOCATION INFORMATION OF USER |
|---|---|---|---|---|---|---|---|---|
| COMPANY SS | SALES | ss000001 | 192.168.1.100 | 80 | TCP | A3012526 | INTERNET | SL0001 |
| COMPANY SS | DEVELOPMENT | ss000002 | 192.168.1.101 | 20000 | TCP | A3012527 | GROUPWARE | SL0001 |
| COMPANY SS | ADMINISTRATION | ss000003 | 192.168.1.102 | 5000 | UDP | A3012530 | NEWS | SL0001 |
| FILM MAKER A | PUBLIC RELATION | aa00001 | 10.10.1.20 | 10200 | TCP | B3012526 | MESSENGER | GG0001 |
| BANK B | BRANCH BB | bb00001 | 10.10.2.23 | 10211 | UDP | B3012523 | VIDEO CONFERENCE | GG0031 |
| COMPANY YY | SALES | yy00001 | 211.239.20.1 | 8080 | TCP | B3012529 | SALES MANAGEMENT SYSTEM | GJ0001 |
| COMPANY YY | DEVELOPMENT | yy00002 | 211.239.20.2 | 8282 | UDP | C3012520 | APPROVAL | BS0001 |
| COMPANY YY | ADMINISTRATION | yy00003 | 211.239.20.3 | 80 | TCP | C3012526 | ERP | BS0001 |

FIG. 7

| Network Type (501) | Record Opening Time (512) |
|---|---|
| MDN (502) | Duration (513) |
| Served IMSI (503) | Cause for Record Closing (514) |
| Served MSISDN (504) | Diagnostics (515) |
| Service Name (505) | Sequence Number (516) |
| Session ID (506) | Data Volume - Uplink (517) |
| PGW Address (507) | Data Volume - Downlink (518) |
| Access Point Address (508) | Charging ID (519) |
| Terminal IP Address (509) | Charging Characteristics (520) |
| Network Group Name (510) | PLMN Identifier (521) |
| URL Information (511) | Time Zone (522) |

SEPARATE BILLING SYSTEM FOR BYOD SERVICE AND SEPARATE BILLING METHOD FOR DATA SERVICE

CROSS-REFERENCE TO RELATED APPLICATION

This application claims priority to and the benefit under 35 U.S.C. §119(a) of Korean Patent Application No. 2013-0055235, filed on May 15, 2013 and Korean Patent Application No. 2013-0070175, filed on Jun. 19, 2013, in the Korean Intellectual Property Office, the entire disclosure of which is incorporated herein by reference for all purposes.

BACKGROUND

1. Field

The following description relates to a system for performing a separate billing according to the type of a service in a BYOD service providing system, and a method of performing a separate billing according to the type of a service in a data service providing system.

2. Discussion of Related Art

As mobile devices such as smartphones have been widely used, there is an increasing demand for the Bring Your Own Device (BYOD) service for performing tasks by use of a mobile device.

A service provided to a user through a terminal is divided into a service for an individual use and a service for work. Accordingly, the billing needs to be classified according to the type of a service used by a user.

A user may use a terminal for an individual use separately from a terminal for work, but receiving all services through a single terminal is more convenient and cost effective.

There is a conventional billing method in which data used by a user are charged at different rates depending on the types of services, for example, internet, video, or VOIP services. In addition, according to a conventional technology, there is a method of charging an individual separately from a business by allowing a business to bear some amount of a charge for a service provided to a user.

SUMMARY OF THE INVENTION

The billing method in which a different rate is applied depending on the type of a service has a difficulty in distinguishing the individual service from the work service. In addition, the method of charging a company for some part of a service used by a user is not an accurate method.

In one general aspect, there is provided a separate billing system including a business service server, a terminal, a billing policy server, a BYOD service gateway, and a separate billing server. The business service server may be configured to provide a business service. The terminal may be configured to request a business service from the business service server. The billing policy server may be configured to store billing policy information. The BYOD service gateway may be configured to control the terminal to transmit and receive data with the business service server via a wireless network, and generate billing data according to the transmission and reception. The separate billing server may be configured to analyze the billing data based on the billing policy information, and generate separate billing information.

In another general aspect, there is provided a separate billing method for a data service in a system for receiving data service through a mobile communication network or a WiFi network by a terminal, the separate billing method including: by a billing policy server, transmitting service information to a BYOD service gateway and transmitting billing policy information to a separate billing server, by the terminal, requesting the data service from the BYOD service gateway, by the BYOD service gateway, authorizing the terminal, and if the authorization is successful, setting a session between the terminal and a server providing the data service, by the BYOD service gateway, transmitting billing data on the data service that is generated by use of the service information to the separate billing server, by the separate billing server, generating separate billing information by use of the billing data and the billing policy information, and by the separate billing server, transmitting the separate billing information to a billing system of a network operator.

The service information may include: a subject related service information including at least one of a service domain, a type of a service, a business ID, and a business service server ID; and subscriber information including at least one of service subscription, service cancellation, service activation, and service inactivation for each of a user of the terminal and a business.

The billing policy information may include at least one of the service information and user information, wherein the service information may include at least one of a service domain, an access port number, a type of a service, business information, a billing criterion information, a subject to be serviced, a QoS ranking, and a billing rate ranking, and the user information may include least one of identification information of a company, organization identification information of a company, identification information of a user, identification information of a user network, protocol information, identification information of an application executed by a user, identification information of content requested by a user, and location information of a user.

In the generating of the separate billing information, the separate billing information may be generated from one or a combination of at least two of billing criteria including a terminal ID, a type of a wireless network, a business ID, a type of a business service, and a subject to be charged.

In the setting of the session, the authorization of the terminal may be performed by the BYOD service gateway by use of information of the terminal through an authentication authorization accounting (AAA) server interworking with a system providing the data service.

As is apparent from the above, an administrator can easily set and manage service information and policy information for separate billing.

A separate billing is performed regardless of the type of a network access device allowing a user to receive a data service therethrough.

A billing for data services is performed in a way to be differentiated based on various criteria, such as the type of a service, the type of an access device (route) for receiving a service, a user, and a business providing a service.

BRIEF DESCRIPTION OF THE DRAWINGS

FIG. 4 is a table illustrating an example of service information included in billing policy information.

FIG. 5 is a table illustrating an example of user information included in billing policy information.

FIG. 7 is a view illustrating an example of a configuration of billing data.

Figure 1:
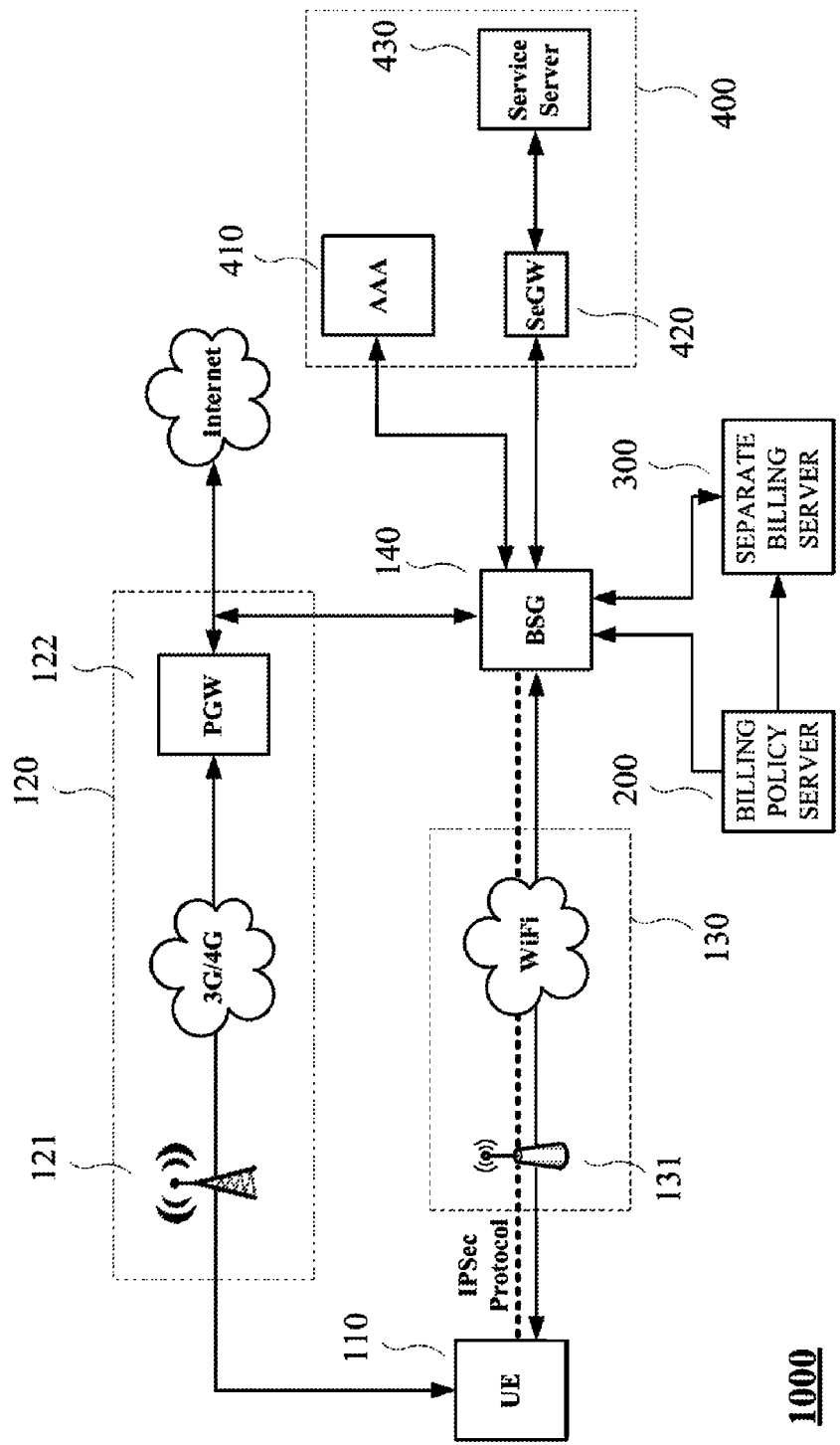
FIG. 1 is a block diagram illustrating an example of a schematic configuration of a separate billing system for BYOD service.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

All terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the co ext of the relevant art and will not be interpreted in an idealized or overly formal sense unless expressly so defined herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It should also be noted that in performing a method or an operating method, processes of the method may occur out of noted order unlike otherwise mentioned. In other words, the respective processes may be executed in the same order as the noted order, may be executed substantially concurrently, or may be executed in the reverse order.

The following description relates to a system and method for generating billing information for a terminal that receives data services through various routes, such as a mobile communication network provided by a mobile network operator, a WiFi network, and a virtual private network (VPN).

A terminal includes a general mobile terminal, a smartphone, a tablet PC, notebooks, and a personal computer. In addition, all devices capable of accessing a network provided by a mobile network operator and a WiFi network may be included in the terminal.

A terminal passes through an access device, such as a mobile communication network or a WiFi network to make an access a server that provides a certain data service. The type of an access device is not limited.

A network provided by a mobile network operator represents a network using 2G, 3G, LTE, and LTE-Advanced. In the following description, the type of a standard used for a data transmission/reception scheme and a communication is not limited, but is various communication schemes to be applied thereto.

In addition, the access device includes a WiFi network used in households, offices, and other public places. Besides a WiFi scheme, various communication schemes may be used, for example, Wibro. In addition, the access device includes an additional VPN using a security protocol.

The following description may be applied to a system providing a Bring Your Own Device (BYOD) service. The BYOD service represents a service allowing an individual to access corporate information or execute a relevant application by using a terminal possessed by the person. However, a user may receive a service for individual use or a service for work by use of the terminal possessed by the user, and the individual service needs to be separately charged from the work service in a BYOD system.

Hereinafter, the separate billing system for BYOD service 1000 and a separate billing method for BYOD service will be described in detail with reference to the accompanied drawings.

FIG. 1 is a block diagram illustrating an example of a schematic configuration of the separate billing system for BYOD service 1000.

A billing policy server 200 is configured to support a function to manage a policy for processing a separate billing on an individual and a business, and deliver the policy. A separate billing server 300 is configured to support a function to divide billing data for an individual from billing data for a business to separately charge the individual and the business. A Bring Your Own Device (BYOD) service gateway (BSG) 140 is configured to serve to process a service request by a user and data according to a service policy, and perform an access control, user authorization, and billing data generation.

The separate billing system for BYOD service 1000 includes a business service server 430 configured to provide a business service, a terminal 110 configured to request a business service from the business service server 430, the billing policy server 200 configured to store billing policy information, the BYOD service gateway 140 configured to control the terminal 110 to transmit and receive data with the business service server 430 via a wireless network, and generate billing data according to the transmission and reception, and the separate billing server 300 configured to analyze the billing data based on the billing policy information and generate separate billing information.

The above identified system is a system related to a BYOD service, and a server providing a data service is referred as a business service server 430. The wireless network represents an access device used when the terminal 110 accesses the business service server 430. The access device shown in FIG. 1 is illustrated as a mobile communication network 120 provided by a network operator or a WiFi network 130.

The mobile communication network 120 includes a mobile communication access point (AP) 121, such as a base station, and a packet data network gateway (PGW) 122. The WiFi network 130 includes a WiFi AP 131. A route network device is generally known to the skilled in the art, and detailed description thereof will be omitted.

The WiFi network 130 has a vulnerable security. Accordingly, as shown in FIG. 1, the separate billing system for BYOD service 1000 may use a security tunneling, such as a IPSec on a route for the WiFi network 130. As the terminal 110 transmits an IPSec protocol to the WiFi AP 131, an IPSec security tunneling is formed on a subsequent route.

The billing policy server 200 sets and manages policy information, such as business information, service information, QoS information, service specified sponsor information, and billing scheme, to process a separate billing for an individual and a business, and transmits the defined policy to the BYOD service gateway 140 and the separate billing server 300. The separate billing server 300 supports a function to distinguish services according to the billing policies defined with respect to billing data that has been used by a user, and process a billing for an individual separately from billing for a business, and transmits generated separate billing information to an external server.

The BYOD service gateway 140 controls data transmission/reception between the access device and a business intranet 400. In addition, the BYOD service gateway 140 performs a separate billing for a data service while interworking with the billing policy server 200 and the separate billing server 300.

The BYOD service gateway 140 performs a traffic processing function through LTE or WLAN, a billing data generation function, an interworking function with a Secure Gateway (SeGW) 420 in the business intranet 400 for security, a group communication function (a communication function between subscribers belonging to the same corporation subscriber and a function of blocking the access of subscribers outside), an access control on a subscriber who has not been serviced for a predetermined time, and an authorization of the terminal 110.

The terminal 110 makes an access to the mobile communication network 120 or the WiFi network 130 by use of access information that may be stored in an additional server retaining access information or stored in the terminal 110. In this case, the access information may limit an accessible network to the AP 121 or the WiFi AP 131. For example, a user working in an office may access the business service server 430 through the WiFi AP 131 installed on the office building.

The business intranet 400 includes an Authentication, Authorization, and Accounting (AAA) 410, the SeGW 420, and the business service server 430. The AAA 410 is configured to authenticate whether the terminal 110 is allowed to receive a business service, in cooperation with the BYOD service gateway 140. The SeGW 420 is configured to grant the business intranet 400 a security by use of a security protocol. The business service server 430 is configured to provide a business data service. The business service server 430 allows a user to access an application server of a service provider, a corporate system, and restricted in-house information through a WEB or an application program.

Figure 2:
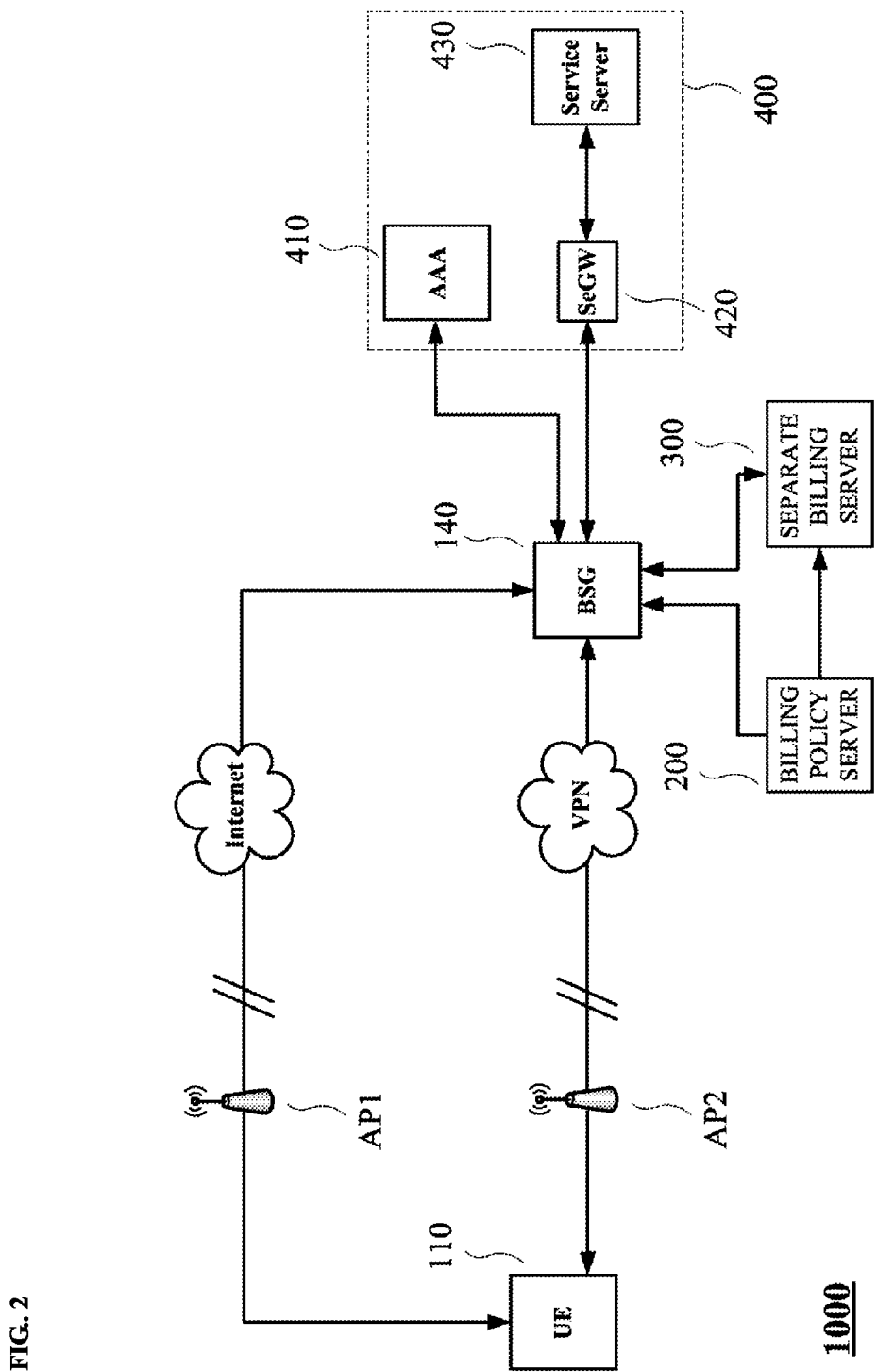
FIG. 2 is a block diagram illustrating another example of the configuration of the separate billing system for BYOD service.

FIG. 2 is a block diagram illustrating another example of the configuration of the separate billing system for BYOD service 1000.

In FIG. 2, the terminal 110 accesses an AP1, and requests a business service from the BYOD service gateway 140 via the Internet. In this case, the AP1 includes the mobile communication AP 121 or the WiFi AP 131. The AP1 is included in a network device that may access the Internet. In addition, the terminal 110 accesses an AP2, and requests a business service from BSG via a virtual private network (VPN). Various access methods including 2G, 3G, LTE, LTE-Advanced, WiFi, and Wibro may be used as a route for the access to VPN. In addition, the access device may use a time division communication method as well as a frequency division communication method.

FIG. 2 has the same configuration as that of FIG. 1 except the access device. The following description will be made in relation to a configuration and process of performing a separate billing.

Figure 3:
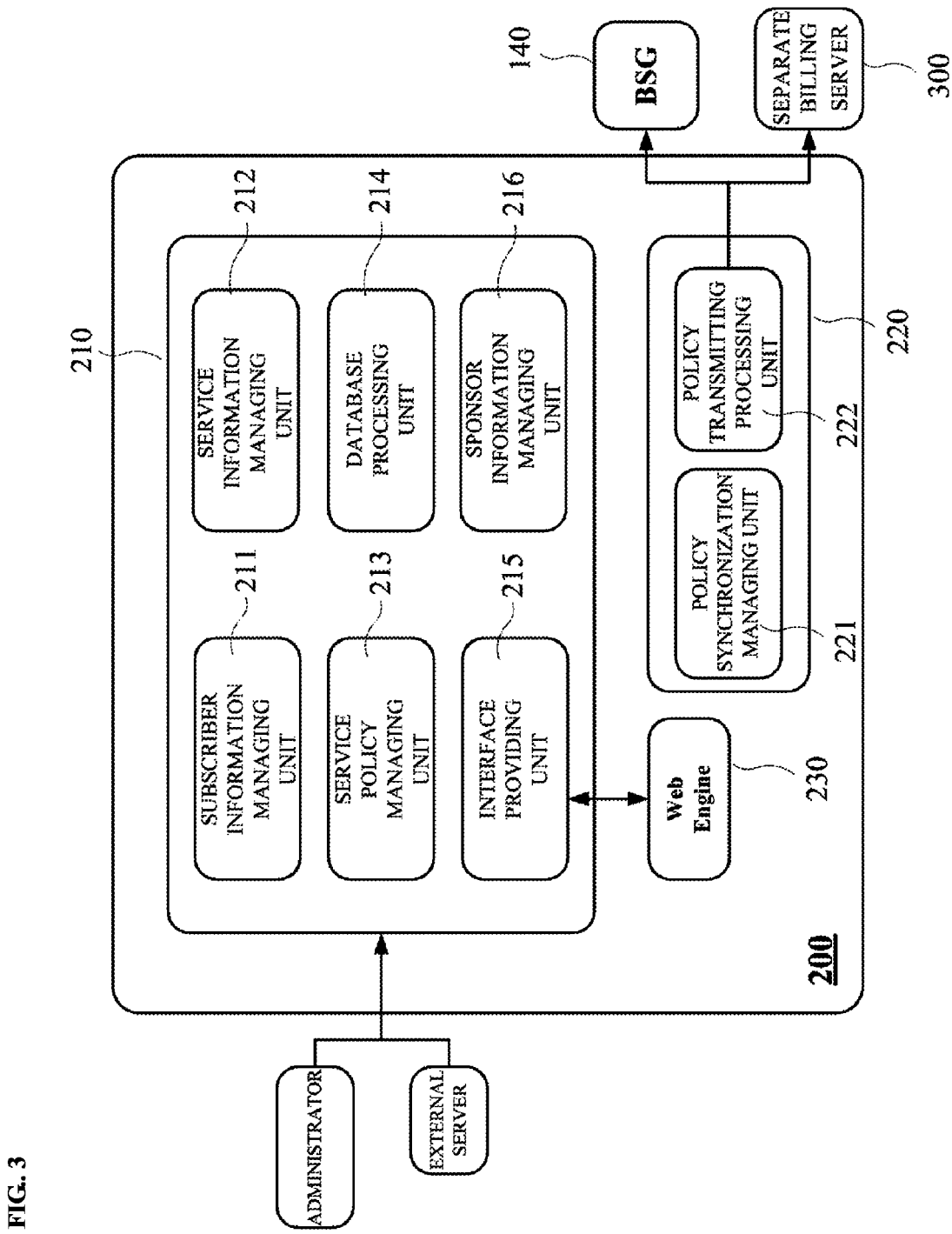
FIG. 3 is a block diagram illustrating an example of a configuration of a billing policy server.

FIG. 3 is a block diagram illustrating an example of a configuration of the billing policy server 200. The billing policy server 200 stores billing policy information for a separate billing. The billing policy server 200 sends the BYOD service gateway 140 service information and subscriber information which are needed by the BYOD service gateway 140 to generate billing data from among the billing policy information. In addition, the billing policy server 200 sends the separate billing server 300 information serving as a billing criterion needed by the separate billing server 300 to generate separate billing information from among the billing policy information.

The billing policy server 200 includes an interface unit 210 configured to receive billing policy information from a user or an additional server and a policy transmitting unit 220 configured to transmit the received billing policy information to at least one of the BYOD service gateway 140 and the separate billing server 300.

The interface unit 210 includes a subscriber information managing unit 211 configured to manage information of a subscriber who receives a business service, a service information managing unit 212 configured to manage business service information and business information, a service policy managing unit 213 configured to manage a QoS ranking according to services and a security ranking according to services, and manage billing rate information according to the QoS ranking and the security ranking according to services, and a database processing unit 214 configured to receive billing policy information from an external server and store the received billing policy information.

The interface unit 210 may further include a sponsor information managing unit 216 configured to manage sponsor information to charge an additional sponsor other than a user of the terminal 110 or a business that provides the business service.

An interface providing unit 215 is configured to allow an administrator to set information that is needed for separate billing through a computer device directly connected to a server or a web. The interface providing unit 215 allows a user to input information that is needed for separate billing by use of a web engine 230.

The subscriber information managing unit 211 manages information about subscription, cancellation, and activation/inactivation among user information that is needed for a policy.

The service policy managing unit 213 manages a QoS ranking to provide a business with a service and a security ranking for services. In addition, the service policy managing unit 213 may set a rate according to the QoS ranking and the security ranking for services. For example, the service policy managing unit 213 may manage a BYOD policy at three categories including a business, a service, and a QoS. In addition, each category provides functions of registration, deletion, change, and inquiry.

The service information managing unit 212 provides a function to input business information and service information for a separate billing. The service information managing unit 212 may manage business information of a business that is subject to charging for a certain service and the type of a service that is subject to charging. The type of a service may represent a mail service, a groupware service, or a financial service.

The database processing unit 214 receives policy information in a designated format from an external server other than an administrator, and stores the received policy information.

The sponsor information managing unit 216 manages service information of a service that is charged to a sponsor, a subscriber to be serviced, a serving period, and a billing rate information.

The policy transmitting unit 220 may include a policy synchronization managing unit 221 and a policy transmitting processing unit 222. The policy synchronization managing unit 221 manages a distribution state according to a policy by the billing policy server 200. Each policy is transmitted to the policy transmitting processing unit 222 by the policy synchronization managing unit 221. The policy transmitting processing unit 222 provides a function to transmit the policy transmitted from the policy synchronization managing unit 221 to a linked system. That is, the policy synchronization managing unit 221 divides information needed by the BYOD service gateway 140 from information needed by the separate billing server 300 among the billing policy information that is managed by the billing policy server 200, and separately transmits the divided information. In addition, the policy synchronization managing unit 221 may control the type of information transmitted from the BYOD service gateway 140 and the separate billing server 300 depending on a setting.

FIG. 4 is a table illustrating an example of the billing policy information. The billing policy information may include at least one of service information and user information, in which the service information includes at least one of a service domain, an access port number, a type of a service, business information, a billing criterion information, a subject to be serviced, a subject to be charged, a QoS ranking, and a billing rate ranking, and the user information includes at least one of company identification information, organization identification information in a company, user identification information, identification information of a user network, protocol information, identification information of an application executed by a user, identification information of content requested by a user, and location information of a user.

The billing policy information may be determined as at least one from among information about services provided to a user and information about a user receiving services, or as a combination of at least two from among information about services provided to a user and information about a user receiving services.

The service information corresponds to information configured to basically identify a service. For example, service information may include service domain information, that is domain identification information providing a service, an access port number of a network providing a service, service type information representing a detailed type of a service, business information of a business providing a service, information about QoS ranking that needs to be maintained when a service is being provided, information about a rate for billing, information of a subject to be serviced, information of a subject to be charged, and information about other criteria for billing.

The service domain represents URL or IP information allowing a user to request a service through an access device. The port represents an access port number used for a user to communicate with a service server that requests a service through the terminal 110. The type of a service represents a group of services classified according to the form of services provided by the business service server 430. The business information represents information or identifier of a business providing a service through the business service server 430.

The subject to be charged represents information of a subject who is to be charged for the provided service. The subject to be charged may be a user of the terminal 110, a business that provides a business service, or a sponsor other than the user or the business. The billing criterion information represents information about a criterion used to perform billing on a service provided, for example, the amount of a service used and an available bandwidth. The subject to be serviced represents information of a service-specific group of subscribers capable of receiving a service. The subject to be serviced may be an employee of a certain company, all users, or a registered user.

The QoS ranking represents QoS ranking information based on the transmission performance and capacity of services being provided. The billing rate ranking represents information about a billing rate ranking that is determined based on the number of services and the amount of data used by each business and each sponsor.

The information about the subject to be charged is important when a user using a service is different from a subject who is charged for the service. Accordingly, the billing policy information is composed in various forms depending on the form of a service by use of at least one from among the service information or a combination of at least two from among the service information. The user information includes a name and identification information of an organization such as a company, identification information of a small organization in a company (a team or a department), and personal identification information of a user. In addition, the user information may include information about a source IP, a port number, and a type of a protocol that are used by a user. The information about a source IP, a port number, and a type of a protocol that are used by a user may be referred to as identification information about a network used by a user. In addition, the user information may include a name and identification information of an application used by a user, and identification information of content used by an application. In addition, the user information may include location information at which a user exists. The location information represents an address, coordinates information detected by a GPS device, and information about a base station to which a user makes an access. The location information notifies whether a user is at home or work, or on a business trip.

FIG. 5 is a table illustrating an example of user information of the billing policy information. FIG. 5 has items of a business ID, a department ID, a user ID, user port information, information about a protocol used by a user, application ID used by a user, a content ID used by a user, and location information about a user. The billing policy information may generate billing information in various types from at least one or a combination of at least two from the above specified user information.

Figure 6:
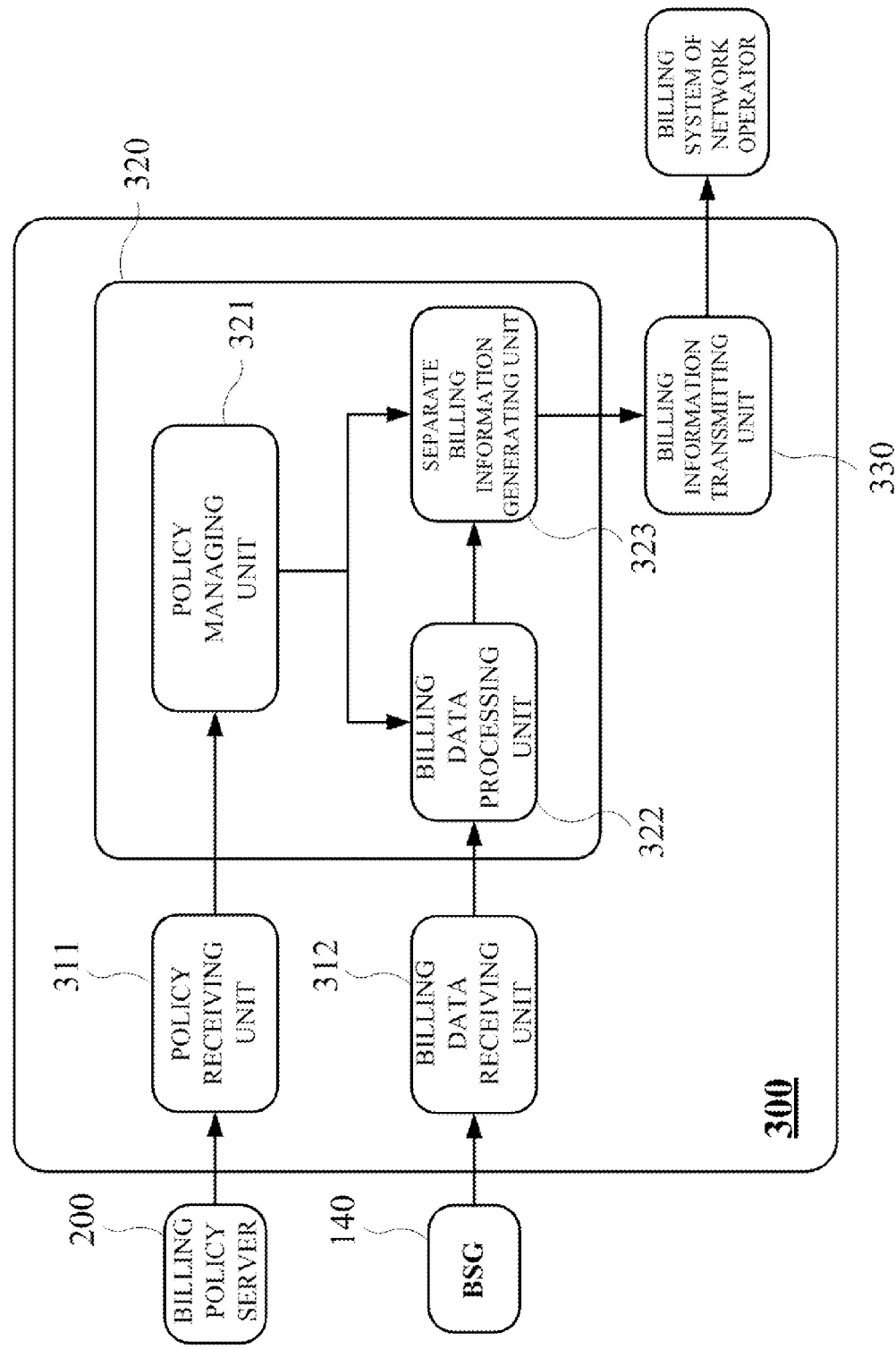
FIG. 6 is a block diagram illustrating an example of a configuration of a separate billing server.

FIG. 6 is a block diagram illustrating a configuration of the separate billing server 300.

The separate billing server 300 includes a policy receiving unit 311 receiving billing policy information from a policy managing server, a billing data receiving unit 312 receiving billing data from the BYOD service gateway 140, a separate billing managing unit 320 generating separate billing information for a user of the terminal 110, a business providing a business service, or a sponsor other than the user and the business according to the billing policy information, and a billing information transmitting unit 330 transmitting the separate billing information generated by the separate billing managing unit 320 to a billing system of a network operator.

A data generated by the BYOD service gateway 140 by analyzing a data service provided to the terminal 110 is referred to as billing data, and a billing related data finally generated by the separate billing server 300 by use of the billing policy information and the billing data is referred to as separate billing information.

The policy receiving unit 311 performs synchronization on billing policy information by interworking with the billing policy server 200. The billing data receiving unit 312 receives the billing data while interworking with the BYOD service gateway 140.

The separate billing managing unit 320 provides a function to manage policy information received from the billing policy server 200 and manage billing information data (CDR) received from the BYOD service gateway 140.

The separate billing managing unit 320 includes a policy managing unit 321, a billing data processing unit 322, and a separate billing information generating unit 323.

The policy managing unit 321 divides the policy received from the billing policy server 200 into a policy for a business, a policy for a service, and a policy for a QoS that are to be separately managed. The divided policies are used by the separate billing managing unit 320 to generate separate billing for billing data.

The billing data processing unit 322 performs a validity test and an analysis task on the received billing data. In addition, the billing data processing unit 322 provides a function to convert the received data into a form corresponding to information that is required by a billing system of a network operator.

The separate billing information generating unit 323 finally generates separate billing information by analyzing the billing data according to the billing policy information. The separate billing information includes information about a user, information about a data service provided to a user, a charge for the provided data service, and a subject to be charged.

The billing information transmitting unit 330 transmits the final separate billing information to the billing system of the network operator.

FIG. 7 is a view illustrating an example of a configuration of the billing data. The billing data includes at least one of a type of an access device, a service name, a terminal ID, a business service server ID, a service domain, a time for providing services, a data size, a network operator ID, and a billing data unique ID.

The BYOD service gateway 140 periodically or non-periodically generates billing data when a session between the terminal 110 and the business service server 430 is maintained, and transmits the generated billing data to the separate billing server 300. The billing data is generated by use of subscriber information and service information, from among billing policy information received from the billing policy server 200. In addition, the billing data may be generated by further using unique information (an identifier, and the type of a network) transmitted from the terminal 110 and a communication network access device.

The illustration of FIG. 7 is provided only as an example of the billing data. The billing may be implemented in various forms different from FIG. 7. Hereinafter, the billing data shown in FIG. 7 will be described.

A BYOD system may provide a data service through various heterogeneous networks. Network Type 501 represents the type of a wireless network (an access device) at which billing information is currently generated.

Mobile Identify Number (MDN) 502, Served Mobile Subscriber Identity (Served IMSI) 503, and Served Mobile Subscriber ISDN Number (MSISDN) 504 represent identification information of the terminal 110 and identification information of a user who uses the terminal 110.

Service Name 505 represents the name of a BYOD service. A service may be composed of a number of names, and may represent a service name including current billing information.

Session ID 506 represents a unique ID of billing data.

PGW Address 507 represents address information of a node that corresponds to billing information generated at an LTE or 3G network. Access Point Address 508 represents address information of an AP corresponding to billing information generated at a WiFi network.

Terminal IP Address 509 represents address (IP) information assigned to a current user.

Network Group Name 510 represents an identifier of the business intranet 400 that is a target network to which an access is made through a BYOD service. The identifier is implemented using a name, ID, or address information.

URL Information 511 records URL information of a route to which a user makes an access, and corresponds to a request for web access. If necessary, URL Information 511 may provide an analysis result of a certain protocol.

Record Opening Time 512 represents a time at which billing information starts. Duration 513 represents a time interval at which billing data is calculated. The BYOD service gateway 140 generates billing data a number of times before a session ends. Accordingly, there is a need of time interval information about generating billing data.

Cause For Record Closing 514 represents a reason why billing information is provided. Cause For Record Closing 514 represents an end of an abnormal session as well as the meaning of an end of a general session by using a predetermined value. Diagnostics 515 represents a reason why a billing session abnormally ends.

Sequence Number 516 represents a sequence number of billing data.

Data Volume-Uplink 517 and Data Volume-Downlink 518 represent traffic information consumed at an uplink and information consumed at a downlink, respectively, by a user.

Charging ID 519 represents unique information about billing information and Changing Characteristics 520 represents additional information.

PLMN Identifier 521 represents a unique ID of a network operator.

Figure 8:
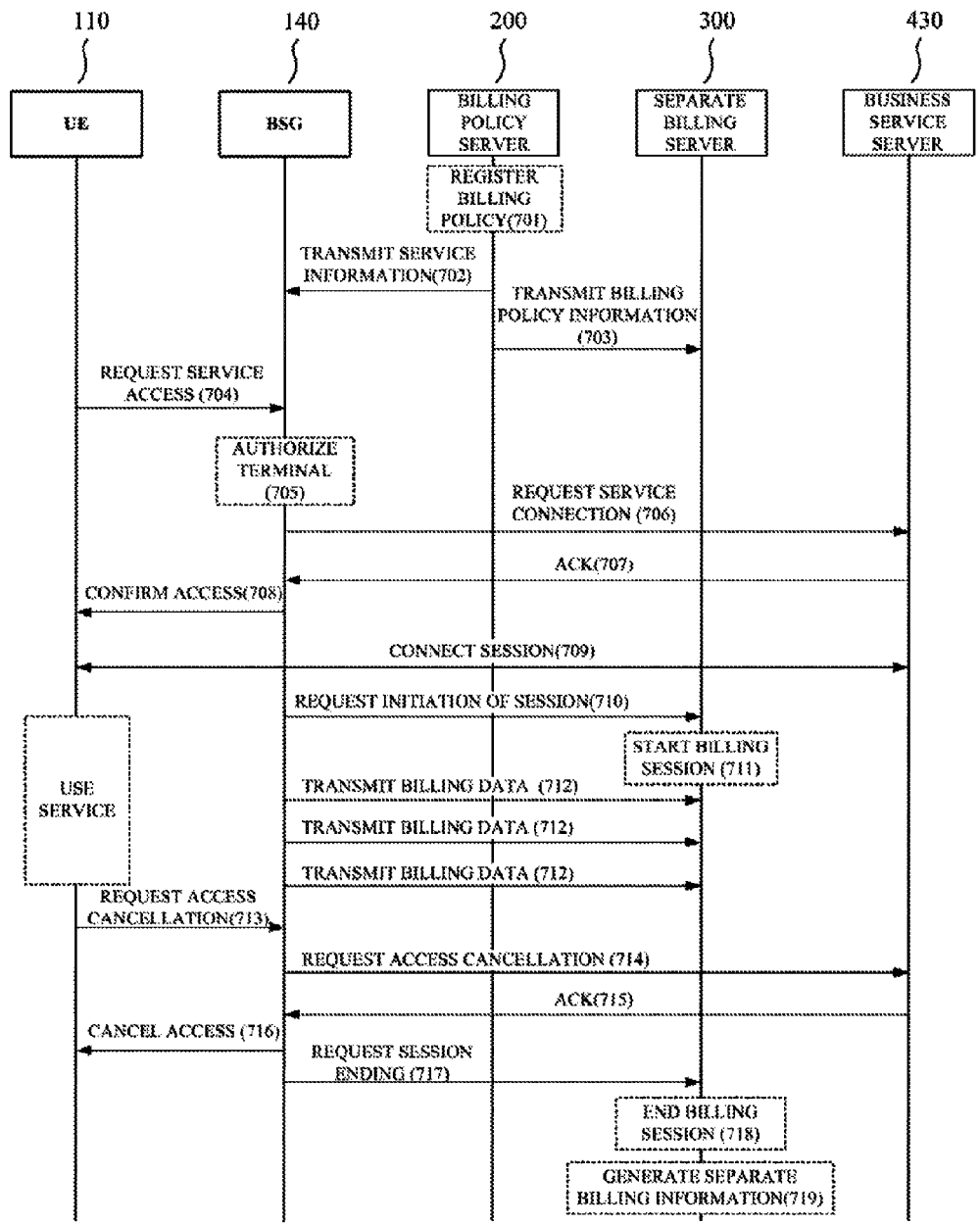
FIG. 8 is a view illustrating an example of an operation sequence of the separate billing system for BYOD service.

FIG. 8 is a view illustrating an example of an operation sequence of the separate billing system for BYOD service 1000.

The billing policy server 200 may receive billing policy information for a separate billing from an administrator, or receive desired information from an external server (701).

Separate billing policy information may include service information for charging a business and a sponsor, business information, information of a subscriber to be serviced, a QoS for each service, a security ranking, and billing rate information for each service or each service provider. In addition, the policy information for separate billing may include billing criteria variables, such as the type of an access network, the amount of a service used, or an available bandwidth, and the type of services.

The billing policy server 200 sends the BYOD service gateway 140 service related information (including subscriber information) among the billing policy information being managed by the billing policy server 200 (702), and sends the separate billing server 300 the billing policy information related to billing (703). Operations 702 and 703 may be performed regardless of a particular sequence, and may be performed simultaneously.

The terminal 110 requests the BYOD service gateway 140 to provide a service access for a data service (704). The BYOD service gateway 140 performs an authorization on the terminal 110 (a user) by use of identification information received from the terminal 110 (705). The terminal authorization process may be implemented through various schemes that are generally known in the art. If the authorization of the terminal is failed, a subsequent service process is not performed.

If the authorization is successful, the BYOD service gateway 140 requests the business service server 430 to provide a service connection (706), and if it is determined by the business service server 430 that a service is able to be provided, the business service server 430 sends an ACK message (707).

The BYOD service gateway 140, after receiving the ACK message from the business service server 430, checks an access state of the terminal 110 that has requested the service (708). In a state that the terminal 110 is connected to a network, the BYOD service gateway 140 performs a session connection between the terminal 110 and the business service server 430 (709).

When the session is connected between the terminal 110 and the business service server 430, the BYOD service gateway 140 sends the separate billing server 300 information notifying that the session starts (710). The separate billing server 300 starts a billing session (711). Until the billing session ends, the BYOD service gateway 140 periodically transmits generated billing data to the separate billing server 300 (712).

If the terminal 110 ends the data service, the terminal 110 sends the BYOD service gateway 140 a connection cancellation request (713). The BYOD service gateway 140 sends the business service server 430 a connection cancellation request (714), and in response to the request, the business service server 430 replies with an ACK message (715). Thereafter, the BYOD service gateway 140 cancels the connection with the terminal 110, and requests the separate billing server 300 to end the session (717).

The separate billing server 300, upon reception of the request for ending the session from the BYOD service gateway 140, ends the billing session by storing billing data collected for the corresponding user in a file or database (718).

The separate billing server 300 divides the stored billing data according to services, and generates separate billing information for each of a user, a business, and a sponsor according to the separate billing policy. When the separate billing information is generated, the separate billing server 300 may determine a billing rate by use of information, such as the type of a service, the QoS ranking, the type of billing, the billing criteria, the security ranking, and the billing rate ranking.

Figure 9:
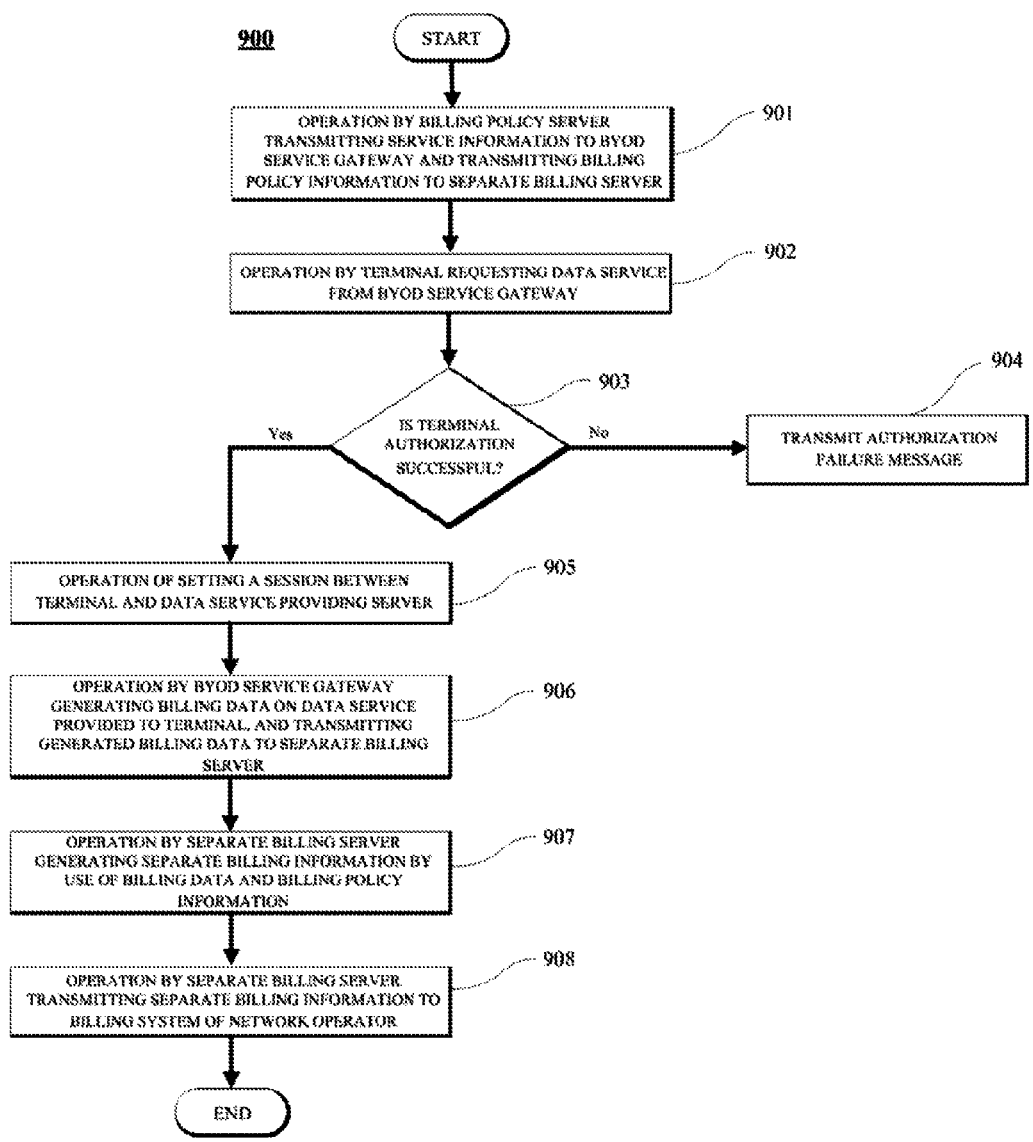
FIG. 9 is a flowchart of an example of a separate billing method for data service.

FIG. 9 is a flowchart of an example of a separate billing method 900 for data service.

The separate billing method 900 for data service includes an operation in which the billing policy server 200 transmits service information to the BYOD service gateway 140 and transmits billing policy information to the separate billing server 300 (901), an operation in which the terminal 110 requests a data service from the BYOD service gateway 140 (902), an operation in which the BYOD service gateway 140 authorizes the terminal 110 (903), and if the authorization is successful, sets a session between the terminal 110 and a server providing the data service (905), an operation in which the BYOD service gateway 140 sends the separate billing server 300 billing data on the data service generated by use of the service information (906), an operation in which the separate billing server 300 generates separate billing information by use of the billing data and the billing policy information (907), and an operation in which the separate billing server 300 transmits the separate billing information to a billing system of a network operator (908). If the authorization of the terminal 110 is failed in operation 903, an authorization failure message may be transmitted to the terminal 110 (904), and the following operations do not proceed.

The separate billing method for data service 900 is provided, with respect to the terminal 110 receiving a data service including a BYOD service, to charge an individual user, a business providing a service, or a sponsor other than the individual user and the business for the data provided to the user.

In operation 901, the service information transmitted to the BYOD service gateway 140 includes: 1) subject related service information including at least one of a service domain, the type of a service, a business ID, and a business service server ID; and 2) subscriber information including at least one of service subscription, service cancellation, service activation, and service inactivation for each of a user of the terminal 110 and a business.

The BYOD service gateway 140 generates billing data by use of the received subject related service information and the subscriber information that are transmitted from the billing policy server 200 as well as identification information of the terminal 110 and identification information of a network device that are transmitted from an access device (a network device).

The billing policy information includes service information including at least one of a service domain, an access port number, the type of a service, business ID, a subject to be charged, billing criterion information, a subject to be serviced, a QoS ranking, and a billing rate ranking In operation 907 of generating separate billing information, the separate billing information is generated from one or a combination of at least two of billing criteria including a terminal ID, the type of an access device, a business ID, the type of a service, and a subject to be charged.

The authorizing of the terminal 110 in operation 903 is performed by the BYOD service gateway 140 by use of information of the terminal 110 through an authentication authorization accounting (AAA) server 410 interworking with a system providing the data service.

The billing data includes at least one of the type of an access device, a service name, a terminal ID, a business service server ID, a service domain, a time for providing a service, a data size, a network operator ID, and a billing data unique ID In operation 906 of transmitting the billing data to the separate billing server 300, the BYOD service gateway 140 periodically transmits billing data to the separate billing server 300 while the session is being maintained. Accordingly, the BYOD service gateway 140 may transmit billing data a number of times.

The following description is made in relation to an example of performing a billing for a data service according to the separate billing system for BYOD service 1000 or a separate billing method for data service, in which FIG. 4 is referred to for an example of separate billing policy information.

The separate billing server 300 generates separate billing information from one or a combination of at least two of billing criteria including a terminal ID, the type of an access device, a business ID, the type of a business service, and a subject to be charged.

In this example, a billing is performed based on one or a combination of at least two from among the policy information for separate billing. Variables involved in the billing may be provided in various combinations, which enables more detailed billing. Main factors of the separate billing include a subject to be charged and a charged amount.

Basically, the subject to be charged may vary with the type of a service requested by a user through the terminal 110. If a service requested by a user is a service domain registered on the billing policy information, a business providing the service or a business registered as a sponsor takes the charged amount.

If a service requested by a user does is not a service domain registered on the billing policy information, or does not correspond to the type of a service registered on the billing policy information, the service is determined to be used for a private purpose. In this case, the service is charged to the individual.

As for a service for work that is charged to a business, the charged amount may vary depending on a terminal (a user) which receives the service. The user may be identified by a terminal ID. The separate billing server 300 may determine one of groups of serviced subjects, to which the terminal ID belongs. For example, a service for work provided by company A may be used by an executive of the company, or a plain clerk. In addition, if the service is not a service containing a corporate secret but a promotional service, others may use the service as well as employees of the company. As described above, even for the same service, a subject to be charged and a billing rate may vary depending on a subject to be serviced.

The billing may vary with the type of a route (an access device) along which the terminal 110 is connected to the business intranet 400. For example, in use of a paid 3G/4G route provided by a mobile network operator, a charge that needs to be provided to the network operator is added. In use of a free route, such as WiFi, an expense for using an access route is reduced, and the entire service charge is reduced. The type of an access device may be identified by a port number to which the terminal 110 is connected. Even in the use of the same mobile communication network 120, a subject to be charged or a charged amount may vary depending on the port number.

A subject to be charged or a charged amount may vary depending on the type of a service provided to a user. For example, the types of services may be divided into a mail service, a groupware service, a specific application execution, a financial service, an advertisement service, and a web portal service. A billing rate may be set differently depending on the type of a service. As in the case in which an advertisement service is charged to a sponsor rather than an individual, a subject to be charged may vary depending on the type of a service.

In addition, depending on a contract with a network operator, a subject to be charged or a charged amount may vary depending on which company provides a desired service. For example, a mail service provided by company A may have a billing rate different from that provided by company B. A service provided by an advertising agency may be charged to the advertising agency or a certain sponsor.

The separate billing server 300 may calculate a charge depending on a billing criterion variable. The billing criterion variable may include a criterion such as the amount of data used or a bandwidth.

A billing rate may vary depending on the QoS ranking for a service. A billing rate may vary depending on a service domain requested by a user or the type of a service requested by a user.

In this example, a subject to be charged and a charged amount may be set differently depending on various criteria for billing, and delivered to a billing system of a network operator. As described above, an administrator may input policy information, which serves as a criterion for billing, into a policy information server, or correct the policy information, thereby ensuring easy management of the billing policy.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A separate billing system comprising:
a business service server configured to provide a business service;
a terminal configured to request a business service from the business service server;
a billing policy server configured to store billing policy information;
a bring your own device (BYOD) service gateway configured to control the terminal to transmit and receive data with the business service server via an access device, and generate billing data based on information from the terminal and the service server to distinguish a private service from a BYOD service; and
a separate billing server configured to analyze the billing data based on the billing policy information for determining a subject to be charged, and generate separate billing information including the subject and a charge for the subject,
wherein the billing data includes at least one of a type of an access device, a service name, a terminal ID, a business service server ID, a service domain, a time for providing services, a data size, a network operator ID, and a billing data unique ID,
wherein the BYOD service gateway authorizes the terminal, and if the authorization is successful, sets a session between the terminal and the business service server.

2. The separate billing system of claim 1, wherein the access device is a mobile telecommunication network provided by a mobile network operator or a WiFi network.

3. The separate billing system of claim 1, wherein the separate billing server generates the separate billing information from one or a combination of at least two of billing criteria including the terminal ID, the type of the access device, a business ID, a type of a business service, and the subject to be charged.

4. The separate billing system of claim 1, wherein the billing policy information includes at least one of service information and user information.

5. The separate billing system of claim 4, wherein the service information includes at least one of the service domain, an access port number, a type of a service, a business ID, a billing criterion variable, a subject to be serviced, the subject to be charged, a QoS ranking, and a billing rate ranking.

6. The separate billing system of claim 4, wherein the user information includes at least one of identification information of a company, organization identification information of a company, identification information of a user, identification information of a user network, protocol information, identification information of an application executed by a user, identification information of content requested by a user, and location information of a user.

7. The separate billing system of claim 1, wherein the billing policy server comprises:
    an interface unit configured to receive billing policy information from the user or an additional server; and
    a policy transmitting unit configured to transmit the received billing policy information to at least one of the BYOD service gateway and the separate billing server,
    wherein the interface unit and the policy transmitting unit are each implemented via at least one processor.

8. The separate billing system of claim 7, wherein the interface unit includes:
    a subscriber information managing unit configured to manage subscriber information of a subscriber who receives a business service;
    a service information managing unit configured to manage business service information and business information;
    a service policy managing unit configured to manage a QoS ranking according to services and a security ranking according to services; and
    a database processing unit configured to receive the billing policy information from an external server and store the received billing policy information,
    wherein the subscriber information managing unit, the service information managing unit, the service policy managing unit, and the database processing unit are each implemented via at least one processor.

9. The separate billing system of claim 7, wherein the interface unit further includes a sponsor information managing unit configured to manage sponsor information to charge an additional sponsor other than a user of the terminal or a business that provides the business service, and
    wherein the sponsor information managing unit is implemented via at least one processor.

10. The separate billing system of claim 1, wherein the separate billing server comprises:
    a separate billing managing unit configured to generate separate billing information for each of a user of the terminal, a business providing the business service, and a sponsor other than the user and the business, according to the billing policy information; and
    a billing information transmitting unit configured to transmit the separate billing information generated by the separate billing managing unit to a billing system of the network operator,
    wherein the separate billing managing unit and the billing information transmitting unit are each implemented via at least one processor.

11. The separate billing system of claim 10, wherein the billing policy information includes at least one of service information and user information, wherein the service information includes at least one of service domain, an access port number, a type of a service, business information, billing criterion information, a subject to be serviced, the subject to be charged, a QoS ranking, and a billing rate ranking, and the user information includes at least one of identification information of a company, organization identification information of a company, identification information of a user, identification information of a user network, protocol information, identification information of an application executed by a user, identification information of content requested by a user, and location information of a user.

12. A separate billing method for data service in a system for receiving a data service through a mobile communication network or a WiFi network by a terminal, the separate billing method comprising:
    transmitting, at a billing policy server, service information to a bring your own device (BYOD) service gateway and transmitting billing policy information to a separate billing server;
    requesting, by the terminal, the data service from the BYOD service gateway;
    authorizing, by the BYOD service gateway, the terminal, and if the authorization is successful, setting a session between the terminal and a service server providing the data service;
    transmitting, by the BYOD service gateway, billing data on the data service that is generated by use of the service information to the separate billing server, the billing data being generated by the BYOD service gateway based on information from the terminal and the service server for the data service to distinguish a private service from a BYOD service;
    generating, by the separate billing server, separate billing information for determining a subject to be charged by use of the billing data and the billing policy information; and
    transmitting, by the separate billing server, the separate billing information to a billing system of a network operator,
    wherein the billing data includes at least one of a type of the access device, a service name, a terminal ID, a business service server ID, a service domain, a time for providing a service, a data size, a network operator ID, and a billing data unique ID.

13. The separate billing method for data service of claim 12, wherein the service information includes:
    a subject related service information including at least one of the service domain, a type of a service, a business ID, and the business service server ID; and
    subscriber information including at least one of service subscription, service cancellation, service activation, and service inactivation for each of a user of the terminal and a business.

14. The separate billing method for data service of claim 12, wherein the billing policy information includes at least one of the service information and user information, wherein the service information includes at least one of service domain, an access port number, a type of a service, business information, a billing criterion information, a subject to be serviced, the subject to be charged, a QoS ranking, and a billing rate ranking, and the user information includes least one of identification information of a company, organization identification information of a company, identification information of a user, identification information of a user network, protocol information, identification information of an application executed by a user, identification information of content requested by a user, and location information of a user.

15. The separate billing method for data service of claim 12, wherein in the generating of the separate billing information, the separate billing information is generated from one or a combination of at least two of billing criteria including the terminal ID, the type of the access device, a business ID, a type of a business service, and the subject to be charged.

16. The separate billing method for data service of claim 12, wherein in the setting of the session, the authorization of the terminal is performed by the BYOD service gateway by use of information of the terminal through an authentication authorization accounting (AAA) server interworking with a system providing the data service.

17. The separate billing method for data service of claim 12, wherein in the transmitting of the billing data to the separate billing server, the BYOD service gateway periodically transmits the billing data to the separate billing server while the session is maintained.

18. The separate billing system of claim 1, wherein the separate billing server determines the subject among a user of the terminal, a service provider of the data service and a sponsor according to the billing policy information.

19. The separate billing method for data service of claim 12, wherein the separate billing server determines the subject among a user of the terminal, a service provider of the data service and a sponsor according to at least one of a service ID, the service name, the terminal ID, the business service server ID and the time.

20. A separate billing system comprising:
a service server configured to provide a data service;
a terminal configured to request a data service from the service server; and
a bring your own device (BYOD) service gateway configured to control data transfer between the terminal and the service server, and generate billing data based on information from the terminal and the service server,
wherein the billing data includes at least one of a type of an access device, a service name, a terminal ID, a business service server ID, a service domain, a time for providing services, a data size, a network operator ID, and a billing data unique ID,
wherein the billing data is used for determining a subject to be charged among an user of the terminal, a service provider of the data service and a sponsor, and for determining a charge for the data service in a billing server,
wherein the BYOD service gateway authorizes the terminal, and if the authorization is successful, sets a session between the terminal and the service server.

* * * * *